Patented Apr. 13, 1954

2,675,384

UNITED STATES PATENT OFFICE 2,675,384

PREPARATION OF PYRAZINOIC ACID

Willard Lewis McEwen, Woodcliff Lake, N. J., assignor to American Cyanamid Company, New York, N. Y., a corporation of Maine No Drawing. Application June 17, 1952, Serial No. 294,080

9 Claims. (Cl. 260—250)

This invention relates to a new method of preparing pyrazionic acid. More particularly this invention relates to an improved method of preparing pyrazinoic acid from 2,3-pyrazine-dicarboxylic acid by decarboxylation.

Pyrazionic acid is a known compound useful as an intermediate in organic synthesis. For instance, in U. S. Patent No. 2,149,279 there is disclosed the use of pyrazionic acid as an intermediate in the preparation of several compounds having utility as analeptics. It has also been reported that pyrazineamide is of value in the treatment of tubercular infections and pyrazinoic acid is a suitable starting material for the preparation of this valuable compound.

The preparation of pyrazionic acid from 2,3-pyrazine-dicarboxylic acid has been previously reported (S. A. Hall and P. E. Spoerri, J. A. C. S., vol. 62, page 664). However, the prior art procedure is not completely satisfactory in all respects especially when an attempt is made to adapt the procedure to large-scale production. According to the prior art procedure, a quantity of 2,3-pyrazinedicarboxylic acid is heated rapidly to about 210° C. in a vacuum sublimation chamber. At about 3 to 4 millimeters of pressure simultaneous decarboxylation and sublimation take place. The primary disadvantage of this procedure from a commercial standpoint is that it requires a relatively pure and dry starting material. Other disadvantages, from a commercial standpoint include the high temperature and low vacuum employed, and the fact that the sublimed pyrazinoic acid tends to condense before it has reached the intended collection receptacle and thereby clog the conduits of the apparatus. The new process of this invention overcomes the above disadvantages in that it is readily adaptable to commercial large-scale production.

As previously stated, the prior art procedure necessitates the employment of a relatively pure anhydrous starting material, and from a commercial standpoint this is a severe disadvantage. The procedure of preparing 2,3-pyrazinedicarboxylic acid comprises oxidizing quinoxaline with potassium permanganate to obtain the dipotassium salt of 2,3-pyrazinedicarboxylic acid from which the free acid is obtained by neutralization with excess hydrochloric acid. The resulting 2,3-pyrazinedicarboxylic acid is recovered from the aqueous acidic solution only by a difficult procedure involving vacuum evaporation of a major portion of the aqueous acidic solvent, drying in an open dish for about twenty-four hours, and then refluxing with acetone and water (Organic Synthesis, vol. 30, page 87). Such a careful procedure is required since if 2,3-pyrazinedicarboxylic acid is heated to a high temperature or for too long a time in the presence of hydrochloric acid, it tends to decompose. It is an important advantage of the new process of this invention that an aqueous acidic solution of 2,3-pyrazinedicarboxylic acid can be employed as a starting material, and as a result, an involved isolation procedure, such as the above, can be avoided.

According to the new process of this invention a hydrous mixture of 2,3-pyrazinedicarboxylic acid is azeotropically distilled with an inert organic solvent, said organic solvent having a boiling temperature at atmospheric pressure below about 150° C., but above about 100° C. and said organic solvent being capable of forming a negative azeotropic mixture with water. While the reaction mixture must necessarily contain water, it may, and usually does, also contain hydrochloric acid and chloride salts.

While the amount of water present is largely a matter of discretion, in so far as the new process is concerned, as a matter of practical convenience there is usually sufficient water to result in an aqueous solution of the 2,3-pyrazinedicarboxylic acid. This is simply because it is inconvenient to obtain the 2,3-pyrazinedicarboxylic acid in concentrated form. If an aqueous acidic solution of pyrazinedicarboxylic acid is to be concentrated to an extent greater than about one part of dicarboxylic acid to ten parts by volume of solution, vacuum evaporation must usually be employed to avoid undue deterioration of the dicarboxylic acid compound and this results in added expense and in the need for more complicated apparatus. It is an advantage that the new process of this invention does not require a high degree of concentration of an aqueous acidic solution of 2,3-pyrazinedicarboxylic acid to produce a suitable starting material. Of course, if desired, vacuum evaporation can be employed to produce a moist cake of the 2,3-pyrazinedicarboxylic acid and this moist cake used as a starting material in the new process of this invention. The latter procedure has the advantage that less organic solvent is required.

As previously stated, the aqueous mixture of 2,3-pyrazinedicarboxylic acid employed as a starting material in the new process of this invention may also contain free hydrochloric acid. As a general rule, more satisfactory results are obtained if the amount of hydrochloric acid present is less than the quantity necessary to give about a 5% solution with the water present. Under some conditions, for instance when the 2,3-pyrazinedicarboxylic acid is evaporated down to a moist cake as described above, there will be sufficient hydrochloric acid present to give a constant boiling mixture, or in other words, about a 20% solution with the water present. Under such circumstances, sufficient water can advantageously be added to reduce the concentration of hydrochloric acid.

The amount of organic solvent employed should be sufficient to result in the azeotropic distillation of the water in the reaction mixture, and preferably in excess of this amount. This does not mean, of course, that all of the solvent must be added to the reaction mixture at the beginning of the azeotropic distillation. To the contrary, this is usually not advantageous and more satisfactory results are obtained if the organic solvent is added gradually throughout the process. In actual practice, the same organic solvent is usually employed over and over again or, in other words, as the azeotropic mixture of water and the organic solvent is removed by distillation, it can be collected and separated into an organic and aqueous phase by the simple procedure of decantation. The organic solvent can then be returned to the reaction mixture. Suitable apparatus for performing such a separation and return is well known to those skilled in the art.

In order for the inert organic solvent to be completely satisfactory for the new process of this invention, it should have a number of physical properties. The most important characteristic of the organic solvent is that it have a boiling point below about 150° C., and preferably below about 130° C., and yet have a boiling point above about 100° C. This is because it has been found that, contrary to expectations, temperatures within the above range are advantageous for the decarboxylation of the 2,3-pyrazinedicarboxylic acid starting material under the conditions of the new process and yet are not sufficiently high to result in undue decomposition of the resulting pyrazinoic acid reaction product. A further characteristic of the organic solvent should be that it form an azeotropic mixture with water, which mixture has a boiling point below about 100° C., and preferably below about 90° C. This characteristic is important for the reason that it allows most of the water and hydrochloric acid in the reaction mixture to be removed at a temperature where it has been found that there is not undue decomposition of the organic materials present. For most advantageous results, the organic solvent should also have a very low solubility in water since otherwise it can not be recovered economically by the simple procedure of decantation.

There are any number of organic solvents which satisfy the above requirements and are, therefore, satisfactory for use in the new process of this invention. The preferred organic solvent is toluene. Toluene is almost completely inert under the conditions of the new process, it forms an azeotrope with water having a boiling point of about 84° C., and it boils when pure at about 111° C. As will be seen from the preceding paragraph, these boiling points are very advantageous. The azeotrope of toluene contains about 20% water and this is sufficiently high to result in a rapid removal of all water from the reaction mixture and the toluene can be readily separated from the water after removal since toluene has a very low solubility in water. Other solvents which can be employed quite satisfactory are chlorobenzene which boils when pure at about 132° C. and forms an azeotrope with water, containing about 28% water, boiling at about 90° C.; and m-xylene which boils when pure at about 139° C. and forms an azeotrope with water, containing about 36% of water, boiling at about 92° C. Other solvents which can be employed include certain of the aliphatic alcohols as illustrated by n-butanol. However, these are not as advantageously employed as toluene and xylene since they have a relatively high solubility in water and this results in excessive solvent losses. Some of the higher boiling ethers can be used with satisfactory results although they are as a rule somewhat more expensive than the hydrocarbon solvents. For instance, isobutyl ether, which boils when pure at about 122° C. and forms an azeotrope with water containing about 23% water which boils at about 89° C., is generally satisfactory. Other suitable inert solvents possessing the above characteristics will readily suggest themselves to those skilled in the art.

The operating procedure for the new process of this invention is relatively simple and comprises simply placing the hydrous 2,3-pyrazinedicarboxylic acid starting material in a suitable distillation apparatus, adding a quantity of a selected organic solvent, azeotropically distilling the resulting mixture and recovering pyrazinoic acid from the resulting residue. During the first initial part of the distillation, the boiling point of the reaction mixture will be roughly that of the azeotrope, and as distillation continues, the boiling point will gradually rise to approximately that of the pure organic solvent. At this point, distillation can be discontinued, but best results are obtained if the heating in the presence of the organic solvent is continued for a period of time, for instance from one to five hours. The organic solvent can then be advantageously allowed to distill completely to give a dry residue from which pyrazinoic acid can be obtained by extraction.

The invention will be more particularly illustrated by the following example.

*Example*

Exactly 4738 grams of quinoxaline were dissolved in 250 liters of water in a 100-gallon stainless steel kettle. To this solution 2200 grams of U. S. P. grade sodium hydroxide were added. Then an aqueous solution of 33 kilograms of potassium permanganate was added with stirring at a rate sufficient to keep the temperature at 80–85° C.

When all the permanganate had been added, the mixture was forced through a filter press in which papers pre-coated with Celite had been added to the regular filter cloths. The press cake was washed with 20 liters of water, and the wash was added to the filtrate. The volume of the combined filtrate and wash was 270 liters. This pale green solution was maintained overnight in an open vessel with good stirring at about 90–96° C. Heat was furnished by a steam jacket. This treatment concentrated the solution to roughly 20 liters.

The cooled concentrate was then placed in a codistilling apparatus and acidified by cautious addition of 15.4 liters of concentrated hydrochloric acid. Forty liters of toluene were added, and distillation was carried out until the distillate was substantially free of water. (During the distillation, toluene was continually added so that the volume of toluene in the distillation apparatus was maintained approximately constant.)

The toluene was drawn off, leaving a hard black mass which was chipped out, dried in air, and pulverized in a Fitzpatrick mill. The resulting powder was charged into a large Soxhlet extractor (made of two 10-gallon glass-lined kettles) and extracted for three days with eight gallons of ethyl acetate. The ethyl acetate was cooled, and the crude product was filtered off by use of a Buchner funnel. A second batch of crystals was recovered by concentrating the ethyl acetate filtrate. The total recovery was 1080 grams of crude pyrazinoic acid.

Exactly 1805 grams of crude pyrazinoic acid were dissolved in 12 liters of hot water. Roughly 25–50 grams of Norit was added, and the mixture was stirred and then filtered hot. The filtrate was cooled in an ice bath, causing the purified product to crystallize. The crystals were filtered off, washed with ice water, and dried in air. The yield was 950 grams of purified pyrazinoic acid melting at about 217° C.

In place of the toluene solvent employed in the above example, equal quantities of other suitable solvents, for instance, xylene or chlorobenzene, can be substituted with satisfactory results.

I claim:

1. The method of preparing pyrazinoic acid which comprises azeotropically distilling a hydrous mixture of 2,3-pyrazinedicarboxylic acid with an inert organic solvent, said organic solvent having a boiling point from about 100° C. to 150° C., and recovering pyrazinoic acid from the resulting distillation residue.

2. The method of claim 1 wherein said organic solvent is xylene.

3. The method of claim 1 wherein said organic solvent is chlorobenzene.

4. The method of preparing pyrazinoic acid which comprises azeotropically distilling a hydrous mixture of 2,3-pyrazinedicarboxylic acid with an inert organic solvent, said organic solvent having a boiling point from about 100° C. to 130° C., and said organic solvent forming an azeotropic mixture with water having a boiling point below about 90° C.; and recovering pyrazinoic acid from the resulting distillation residue.

5. The method of claim 4 wherein said organic solvent is toluene.

6. The method of claim 4 wherein said hydrous mixture of 2,3-pyrazinedicarboxylic acid is contaminated with hydrochloric acid and chloride salts.

7. The method of claim 6 wherein said organic solvent is toluene.

8. A method of preparing pyrazinoic acid which comprises azeotropically distilling with an inert organic solvent, the water from an aqueous solution of 2,3-pyrazinedicarboxylic acid containing less than about 5% hydrochloric acid, removing the organic solvent from the resulting organic anhydrous solution, and then recovering pyrazinoic acid from the resulting residue, said inert organic solvent having a boiling point of from about 100° C. to 150° C. and being capable of forming a negative azeotrope with water.

9. The method of claim 8 wherein said organic solvent is toluene.

No references cited.